(12) United States Patent
Roger et al.

(10) Patent No.: US 12,376,560 B2
(45) Date of Patent: Aug. 5, 2025

(54) AGRICULTURAL MACHINE FOR DISTRIBUTING PRODUCTS FOR ANIMAL FEEDING AND/OR STRAW BEDDING

(71) Applicant: KUHN-AUDUREAU SAS, La Copechagniere (FR)

(72) Inventors: Christophe Roger, La Roche-sur-Yon (FR); Pascal Gautron, Saint-Fulgent (FR)

(73) Assignee: KUHN-AUDUREAU SAS, La Copechagniere (FR)

( * ) Notice: Subject to any disclaimer, the term of this patent is extended or adjusted under 35 U.S.C. 154(b) by 436 days.

(21) Appl. No.: 18/045,549

(22) Filed: Oct. 11, 2022

(65) Prior Publication Data
US 2023/0119342 A1 Apr. 20, 2023

(30) Foreign Application Priority Data

Oct. 20, 2021 (FR) .................................... 21 11129

(51) Int. Cl.
*A01K 5/00* (2006.01)
*A01F 29/00* (2006.01)

(52) U.S. Cl.
CPC ............ *A01K 5/002* (2013.01); *A01F 29/005* (2013.01)

(58) Field of Classification Search
CPC ........ A01F 29/01; A01F 29/14; A01F 29/005; A01F 29/18; A01K 5/002; A01K 5/004; A01K 5/005; A01K 5/007
See application file for complete search history.

(56) References Cited

U.S. PATENT DOCUMENTS

2016/0360706 A1   12/2016   Garnier et al.

FOREIGN PATENT DOCUMENTS

| DE | 202010015055 U1 * | 3/2012 | ............ A01K 5/001 |
| EP | 0970600 A2 * | 1/2000 | ............ A01K 5/001 |
| EP | 0968643 B1 * | 10/2001 | ............ A01F 29/14 |
| EP | 3 103 325 B1 | 3/2018 | |
| FR | 2 627 946 A1 | 9/1989 | |

OTHER PUBLICATIONS

Translation of DE-202010015055.*
Translation of EP-0968643.*
Translation of EP-0970600.*
French Preliminary Search Report and Written Opinion Issued May 18, 2022 in French Application 21 11129 filed on Oct. 20, 2021 (with English Translation of Categories of Cited Documents), 8 pages.

* cited by examiner

*Primary Examiner* — Bobby Yeonjin Kim
(74) *Attorney, Agent, or Firm* — Oblon, McClelland, Maier & Neustadt, L.L.P.

(57) ABSTRACT

The present invention relates to an agricultural machine for distributing products for animal feeding and/or straw bedding comprising a bin for receiving the products, a distribution blower, a product ejection zone, a rotary element fitted with blades mounted in the ejection zone, a drive shaft of the rotary element, a conveyor and/or unraveling system and a rotary indicator positioned outside the ejection zone and able to be driven in rotation directly or indirectly by the drive shaft to send to a user, by its own visual rotation effect, a visual indication of the rotation of the rotary element.

16 Claims, 5 Drawing Sheets

[Fig. 1]
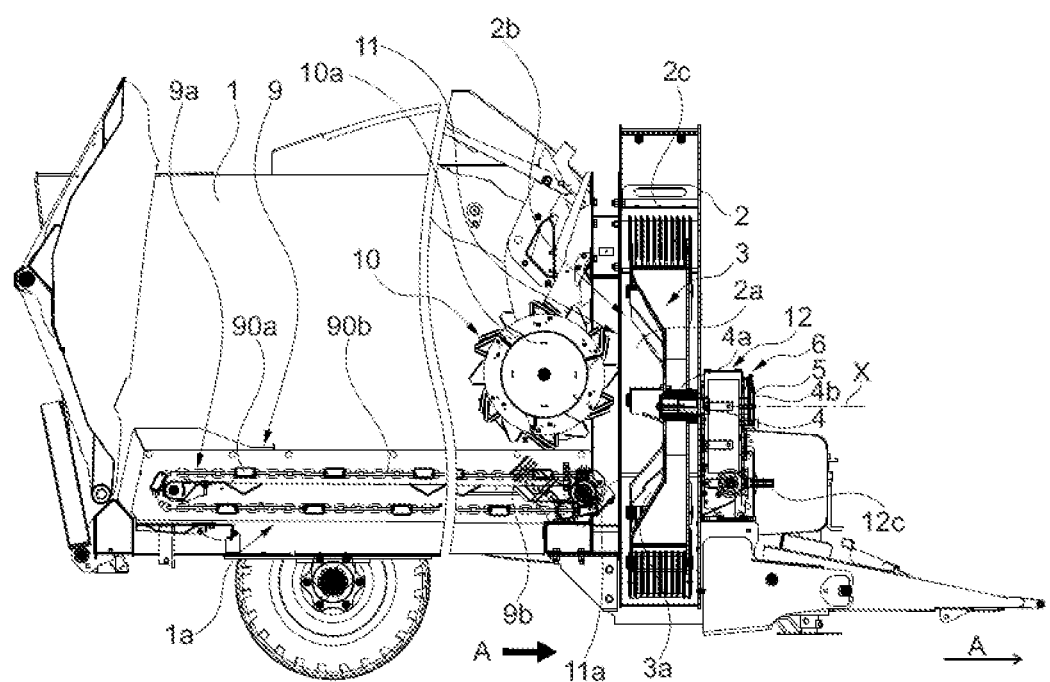

[Fig. 2]
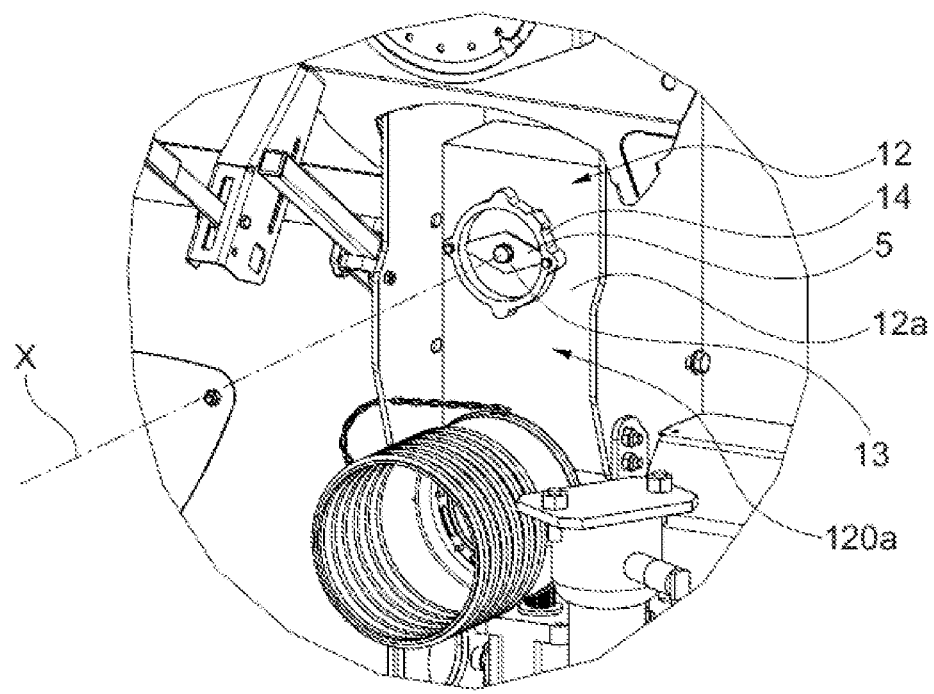

[Fig. 3]
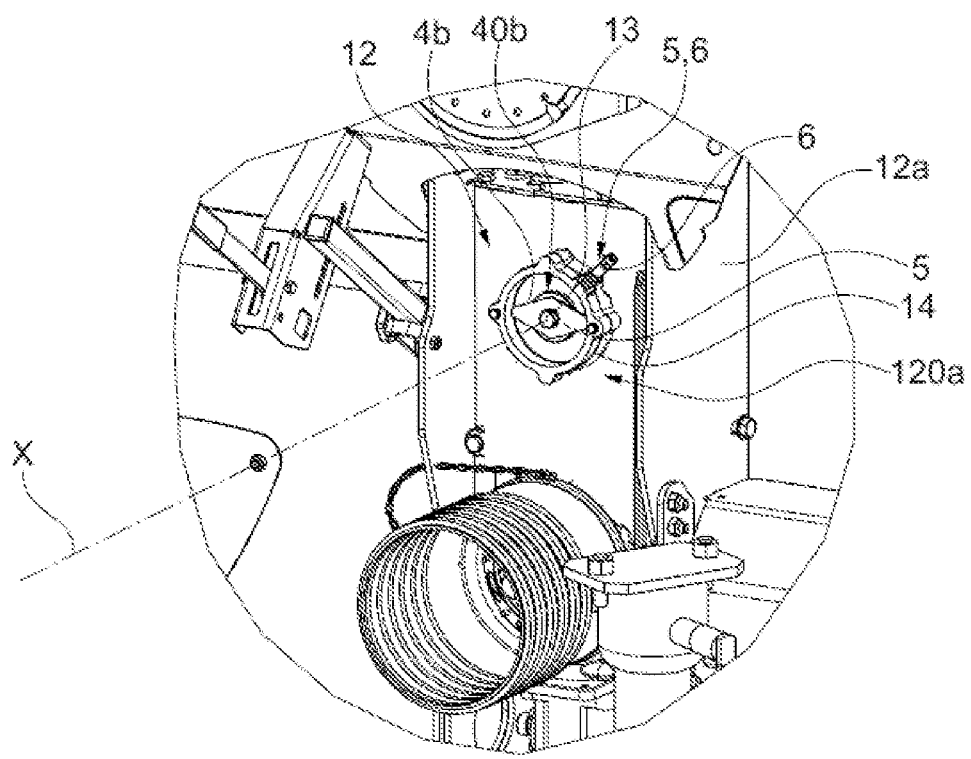

[Fig. 4]
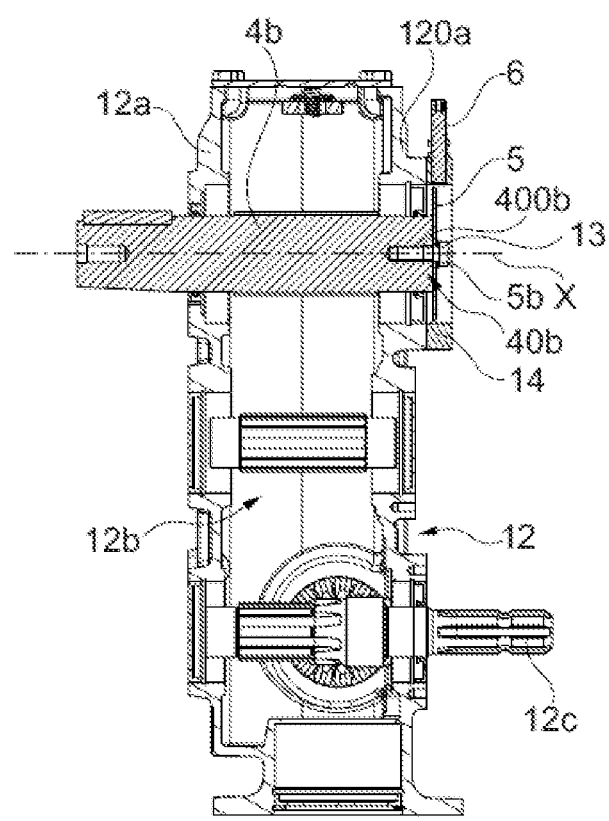

[Fig. 5]
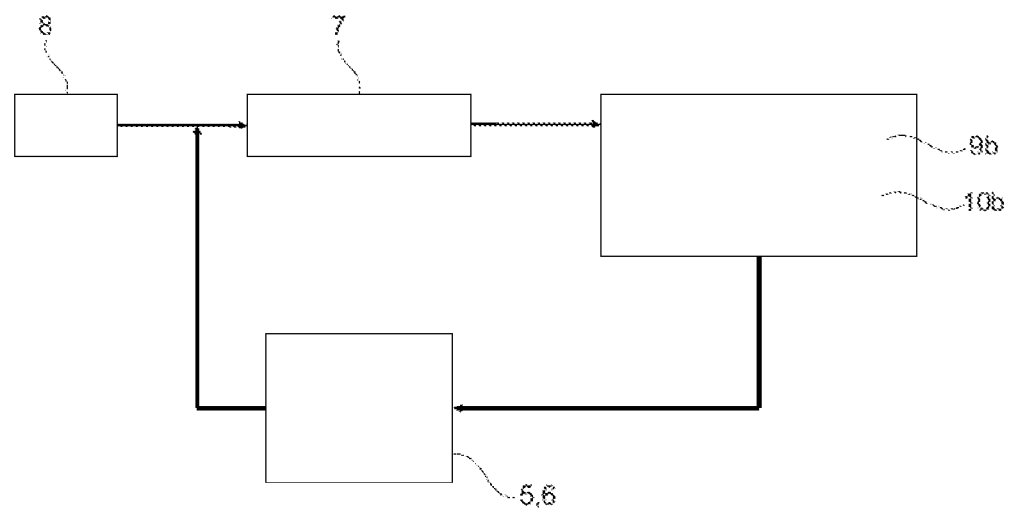

AGRICULTURAL MACHINE FOR DISTRIBUTING PRODUCTS FOR ANIMAL FEEDING AND/OR STRAW BEDDING

BACKGROUND OF THE INVENTION

Field of the Invention

The present invention relates to the agricultural field, particularly to the distribution of products for animal feeding and/or straw bedding; its subject is an agricultural machine for distributing products for animal feeding and/or straw bedding.

Description of the Related Art

Agricultural machines for distributing products for feeding animals by distributing products such as hay or silage, or for animal bedding by distributing products such as straw, are already known.

These agricultural distribution machines, also known as straw-bedders, are designed to receive the products as cube- or cylinder-shaped bales, or in bulk, and to distribute the products by ejecting them away from the machine over the distribution areas.

To achieve this, such an agricultural distribution machine comprises a bin (or bucket) that receives the products, generally at its rear side, and a distribution blower positioned on one side of the bin, generally at the front side of the bin. The blower comprises a casing surrounding an ejection zone and comprising an inlet opening communicating with the inner space of the bin to allow the products to pass from the bin to the ejection zone, and an outlet opening extending in a discharge chute.

The blower also comprises a rotary element, also called a blower plate by some users, mounted in the ejection zone, and a drive shaft allowing the rotary element to be driven in rotation at high speed around a rotation axis extending horizontally and/or parallel to the machine's forward direction. The rotary element comprises blades extending substantially radially.

The bin is furthermore fitted with a conveyor, located at the floor of the bin, for transporting the products poured into the bin to the ejection zone. Generally, the conveyor is combined with an unraveling device in the shape of a drum, located in front of the inlet opening in the ejection zone to be able to transport the products to the latter with a more uniform supply and a more regular flow.

On another hand, these agricultural machines are fitted with a transmission box also known as distribution box, fastened to the front face of the ejection casing. Such a transmission box makes it possible to transmit or convert the rotational movement of a motor shaft, such as a power take-off shaft of a tractor vehicle, to the drive shaft. Other agricultural machines comprise their own motor for driving the blower's drive shaft, such that, in this case, the latter does not need to be connected to a power take-off shaft of a tractor to drive it in rotation.

In operation, the products are first loaded into the bin of the machine, then transported by the conveyor, via the unraveling drum, to the blades of the rotary element in the ejection zone, which blades generate in the latter a flow of air driving, with the high-speed movement of the blades, the products towards the outlet opening of the casing by ejecting them into the chute. Guided by the chute, the products are then ejected from the machine by an outlet of the chute forming a stream of material directed, according to the generally-adjustable orientation of the chute, towards the ground to form the animals' bedding or towards troughs for feeding them.

Such a distribution machine is described and illustrated for example in document EP3103325B1.

While driving, the user can carry out various adjustments/interventions from its driving position to prevent jamming (as far as possible) and obtain the right output/ejection flow rate at the outlet of the chute, for example by acting on the unraveling device, the conveyor's speed of motion or the blower's supply opening.

However, these distribution machines present several problems, particularly with regard to jamming and safety. This is because the various adjustments are not always sufficient to prevent or further reduce jamming, for example where the density or compactness of the products is too great or excessive. This jamming then requires a long intervention (1 to 2 hours) by the user, which is restrictive for him and causes an interruption of the machine's work. In addition, when the rotary element of the blower is not completely stopped, the user may be required, for example following a jamming problem, to work in the machine's ejection zone, where he could be injured by the blades of the still-moving rotary element.

SUMMARY OF THE INVENTION

The present invention aims to overcome these drawbacks.

To this end, the subject of the present invention is an agricultural machine for distributing products for animal feeding and/or straw bedding, the machine comprising, on one hand, a bin delimiting an inner receiving zone for the products, a distribution blower comprising a casing positioned on one side of the bin and enclosing a product ejection zone, the casing comprising an inlet opening communicating with the receiving zone and an outlet opening, and a rotary element fitted with blades and mounted in rotation around a rotation axis in the ejection zone to be able to generate in the latter a flow of air, driving the products, with the motion of the blades, towards the outlet opening, and on another hand, a drive shaft for the rotary element, a conveyor and/or unraveling system making it possible to transport the products from the receiving zone to the ejection zone, and possibly an opening up/closing means of the inlet opening, which essentially comprises a rotary indicator positioned outside the ejection zone and able to be driven in rotation directly or indirectly by the drive shaft in order to give to a user, by its own visual rotation effect, a visual indication of the rotation of the rotary element.

The subject of the present invention is also a combination of an agricultural distribution machine and a tractor vehicle, the agricultural machine being towed by the tractor vehicle comprising a driver's cab, wherein the agricultural machine essentially consists of an agricultural machine according to the present invention and wherein the providing interface is at least partly mounted in the driver's cab of the tractor vehicle.

BRIEF DESCRIPTION OF THE DRAWINGS

The invention will be better understood from the following description, which refers to a preferred embodiment given as a non-limiting example and explained with reference to the attached schematic drawings, in which:

FIG. 1 is a longitudinal cross-section view of an agricultural distribution machine according to one particular embodiment of the present invention;

FIG. 2 is a perspective view of the front portion of the agricultural distribution machine shown in FIG. 1;

FIG. 3 shows the agricultural distribution machine as shown in FIG. 2 with a detection sensor combined to the rotary indicator to form the sensors for the data related to the rotation of the rotary element of the blower;

FIG. 4 shows a cross-section view of the transmission box of FIG. 3;

FIG. 5 shows a block diagram of the data control and collecting system in a particular embodiment of the machine comprising such a system.

DETAILED DESCRIPTION OF THE PREFERRED EMBODIMENT

FIG. 1, and partially FIGS. 2 to 4, show an agricultural machine for distributing products for animal feeding and/or straw bedding, the machine comprising:

a bin 1 delimiting an inner receiving zone for the products, a blower comprising, on one hand, a casing 2 positioned on one side of the bin 1, more specifically the front side (along the machine's forward direction A) of the bin 1 and surrounding a product receiving zone 2a, the casing 2 comprising an inlet opening 2b communicating with the receiving zone 2a and an outlet opening 2c, and on another hand, a rotary element 3 fitted with blades 3a and mounted in rotation around a rotation axis X in the ejection zone 2a to be able to generate in the latter a flow of air, driving the products, with the motion of the blades 3a, towards the outlet opening 2c;

a drive shaft 4 for the rotary element 3;

a conveyor and/or unraveling system 9, 10 making it possible to transport the products from the receiving zone to the ejection zone 2a;

and possibly an opening up/closing means 11 of the inlet opening 2b.

In accordance with the present invention, such a machine comprises a rotary indicator 5 positioned outside the ejection zone 2a and able to be driven in rotation directly or indirectly by the drive shaft 4 to give to a user, by its own visual rotation effect, a visual indication of the rotation of the rotary element 3.

The present invention furthermore comprises a control and collecting system 5, 6, 7, 8 for the data related to the rotation of the rotary element 3 (see FIG. 5).

Generally speaking, during the operation of a machine, the mechanical elements driven in rotation are protected by a protective envelope. Such mechanical elements are, for example, a rotating element, a drive shaft, a transmission and/or gearbox. The protective envelope acts as an external isolation to limit access to the moving mechanical elements and thus to the danger area. A protective envelope is a plastic, sheet metal or cast-iron casing. In normal operation (closed protective enclosure), the rotation of the drive shaft and the rotating part is covered by the protective enclosure. In some cases, the envelope is closed in watertight manner, since it contains the lubricant required for the operation of the mechanical elements.

Preferably, the rotary indicator 5 is able to be driven in rotation around the rotation axis X. In addition, preferably, the rotary indicator 5 is located and configured so as to be visible from outside the machine. The rotation axes X of the drive shaft 4 and of the rotary element 3 are preferably coincident (or aligned). As can be seen particularly in FIGS. 1 and 4, one understands that the rotation axes X of the drive shaft 4, the rotary element 3 and the rotary indicator 5 can preferably be coincident (or aligned).

Still in accordance with the present invention, where such an agricultural distribution machine comprises the data control and collecting system 5, 6, 7, 8, the latter comprises a providing interface 8, sensors able to detect the data and deliver signals representative of the data, and an electronic monitoring unit 7 able to process the signals and transmit information relative to the data to the providing interface 8 to display it visually and/or render it as sound, and/or able to process the signals according to a specific processing program making it possible to determine whether the detected data is representative of normal or abnormal operation of the blower, more specifically of the rotary element 3.

Thanks to the data control and collecting system 5, 6, 7, 8, the distribution process can be made simpler by reducing manual operation by the user on the respective controls of the actuator(s) that control(s) the rotary element 3, the conveyor and/or unraveling system 9, 10 and, where applicable, the opening up/closing means 11. The user will be able to concentrate on the orientation of the chute at the outlet from the blower, where the agricultural machine comprises such a chute in a known manner, and on driving the tractor vehicle. In a particularly interesting manner, by fitting the various rotating/moving elements (conveyor and/or unraveling system 9, 10 and, where applicable, opening up/closing means 11) with at least one measuring means, it will become possible to automate the adjustments and obtain a material flow rate determined according to the speed of the rotary element 3 or based on the speed of travel of the agricultural distribution machine. To this end, the present invention can provide a travel speed sensor configured to detect the speed at which the agricultural distribution machine is moving on the ground, the sensor being able to be combined to a wheel of the bin 1 or to a wheel of the tractor vehicle, for example. By also fitting the bin 1 with a weighing system with load cells, it becomes possible, via the data control and collecting system, to improve the regularity of the flow rate of the shredded material/product through the chute of the agricultural distribution machine.

In a preferred embodiment, as can be seen in FIGS. 1, 2, 3 and 4, the rotary indicator 5 is fastened onto the drive shaft 4 to be driven in rotation around the rotation axis X. The rotary indicator 5 is rigidly fastened onto the drive shaft 4 preferably centered on the rotation axis X. Preferably, the rotary indicator 5 is fastened to one of the ends of the drive shaft 4, called a fastening end (FIGS. 1, 2, 3 and 4). The effect/benefit of this is to directly obtain the rotation information from the rotary element 3, which is driven by the drive shaft 4. The distribution of material is even when the rotary element 3 turns at its required operating speed or at its determined speed. This rotation indication enables the user to check the operation of the blower, more specifically of the rotary element 3, and to act, where applicable, on the conveyor system 9, for example, to stop or slow down the supply to the blower and/or the unraveling device 10. A fast intervention keeps down the risk of jamming in the machine's ejection zone 2a and therefore of a stoppage for an intervention. Thanks to this indication, the user can act in anticipation, as soon as a slow-down of the rotation of the rotary element 3 is detected. Preferably, product is only supplied to the ejection zone 2a of the blower when the rotary element 3a has reached its required operating speed after starting. Due to its inertia, the rotary element 3 continues to turn after the drive shaft 4 has stopped rotating. Thanks to the rotary indicator 5, the user has the information as to whether the drive shaft 4, and therefore the rotary element 3, is rotating or not, and knows when he will be able to intervene without danger, when the rotary element 3 is stopped.

Such an agricultural machine may comprise, in a known manner, a transmission box 12. Such a transmission box 12 makes it possible to transmit or convert the rotational movement of a motor shaft such as a power take-off shaft of a tractor vehicle to the drive shaft 4. Furthermore, the rotary indicator 5 can be fitted at the location of such a transmission box 12 and be visible from the outside thereof. More specifically, the rotary indicator 5 is arranged, as can be seen in FIGS. 1, 2, 3 and 4 at the location of one of the walls 120a of the transmission box 12. The transmission box 12 can also be a speed control box or a gearbox.

Such a transmission box 12 comprises, in a known manner, a box 12a enclosing a transmission device 12b. It furthermore comprises an input shaft 12c able and intended to be connected to a motor drive shaft and to the transmission device 12b. The box 12a, which usually is in a rectangular-parallelepiped shape, comprises walls 120a that delimit the inner space containing the transmission device 12b. One of the walls 120a faces frontward (in the machine's forward direction A) and the rotary indicator 5 can be positioned at the location of the front wall (FIGS. 1, 2, 3, 4). Furthermore, the box 12a is positioned at the front of the machine (in front of the ejection casing 2), making the rotary indicator 5 easily visible, for example, from the cab of the tractor vehicle connected to the agricultural distribution machine. In a variant, the rotary indicator 5 is offset to be in the field of vision of the distribution machine's user, while he is watching the stream of material exiting the blower. The rotary indicator 5 is, for example, positioned to be at eye height for the user (for an average-height user) when sitting in the tractor vehicle.

On another hand, in a preferred embodiment, the drive shaft 4 comprises a first portion 4a connected to the rotary element 3 and a second portion 4b comprising the fastening end 40b of the rotary indicator 5. In addition, the transmission box 12 comprises an output shaft forming the second portion 4b of the drive shaft 4 (see FIGS. 1 and 2 in particular). The fastening end 40b comprises a central tap 400b making it possible to fasten the rotary indicator 5 in using a screw 13 screwed into the central tap 400b, enabling the rotary indicator 5 to be centered on the output shaft 4b and therefore on the drive shaft 4. Tightening the screw 13 is sufficient to stop/block the rotation of the rotary indicator 5 relative to the drive shaft 4. In one variant, other fastening means making it possible to fasten the rotary indicator 5 on the drive shaft 4 can be envisaged, such as fastening by sticking or welding or any other type of fastening that makes it possible to fasten the rotary indicator 5 durably or temporarily on the drive shaft 4, more specifically to one of its ends.

The dimensions of the rotary indicator 5 are defined to be sufficient for it to go beyond or extend laterally beyond the drive shaft 4 to be made visible or more visible due to its rotation effect or to be detected by a sensor, as will be described below.

In one particular embodiment (not shown in the figures), the rotary indicator 5 is in the shape of a disk comprising two opposite faces, one of which is visible to the user and has at least two distinct markings, for example two different colors (for example red/white). The two or more markings enable the user to view the rotation of the disk and consequently to monitor its speed/rpm.

In other particular embodiments, the shape of the rotary indicator 5 is oblong, oval, not round, elongated, diamond-, star- or needle-shaped. Looking more specifically at FIGS. 2 and 3, one can see such a diamond-shaped rotary indicator 5. Such a diamond shape can also be defined as being elongated, not round or flat needle-shaped. The effect/benefit of such non-limiting shapes is to enable the user to view both the rotation of the rotary indicator 5 and its speed of rotation.

The rotary indicator 5 is preferably located behind a Plexiglas or glass type transparent protective screen.

The rotary indicator 5 preferably extends substantially perpendicular to the rotation axis X.

Preferably, the rotation axis X may extend substantially horizontally and/or substantially parallel to the forward direction A of the machine.

The rotary indicator 5 can be mounted directly onto the drive shaft 4 (regardless of whether the latter is made up of one or several portions 4a, 4b as seen previously) or indirectly by means of a link. Such a link can be formed by the output shaft for example. In this latter case, it is understood that, according to a definition or interpretation of the drive shaft 4 other than that mentioned above comprising two portions 4a, 4b, one of which is formed by the output shaft, the output shaft is not deemed part of the drive shaft 4 but linked to the latter by forming the link between the rotary indicator 5 and the drive shaft 4.

In this way, by observing the rotation and speed of rotation of such a rotary indicator 5, the user can discern a variation or change in its speed/rpm, for example a slowing-down representative of a change of speed/rpm of the rotary element 3 or the fact that the rotary element 3 is not fully at a standstill.

Where the agricultural machine comprises the data control and collecting system 5, 6, 7, 8, the sensors comprise at least one inductive, optical, or capacitive sensor 6 and at least one rotary indicator 5 such as a target able to be detected by the sensor and fastened on, or built into, or formed by the rotary element 3 or the drive shaft 4 or the rotary indicator 5. It is understood that the sensor 6 is positioned in relation to the target to be able to detect its passage within its detection radius or field during the rotation of the rotary element 3, the drive shaft 4, or the rotary indicator 5. When the target is fastened on or built into the rotary element 3 or the drive shaft 4 or the rotary indicator 5, it may be an insert, for example metallic, enabling it to be detected by the sensor, of the inductive or capacitive type for example.

On FIGS. 1, 3 and 4 it can be seen that in a preferred embodiment of the sensors, the rotary indicator 5 forms the target of the sensor 6. More specifically, it can be seen that it is the ends of the rotary indicator 5, diamond-shaped for example, that alternately pass close to and are detected by the sensor 6. It is then understood that the sensor 6 is positioned to be close to the passage of the rotary indicator 5 and more specifically, where applicable, to one of its ends to be able to detect it.

The sensor 6 is preferably positioned radially or axially in relation to the rotary indicator 5 or the relevant target formed by another element.

The present invention can provide for an embodiment in which the target is a color and the sensor 6, for example of the optical sensor type, is able to detect the color when the target passes through its detection field. The color target can for example be a colored portion of the rotary indicator 5 or the rotary element 3 or the drive shaft 4 or an element added to them.

Therefore, where the machine comprises such a rotary indicator 5 forming the target of the sensors, even if the rotary indicator 5 is hidden/covered by an equipment, for example a mixing hopper, the user still has the rotation information given by the sensors and representative of the rotation of the rotary element 3. The same applies where the agricultural machine uses/comprises such a data control and collecting system (example not shown in the attached figures) without such a rotary indicator 5 but with a target rigidly attached (i.e. fastened to, or built into, or formed by) to the rotary element 3 or the drive shaft 4 or any other element or component of the machine directly or indirectly linked to the rotation of the rotary element 3.

The present invention therefore provides an embodiment using only one such rotary indicator 5, i.e. without using such a data control and collecting system 5, 6, 7, 8. In this embodiment, the user receives a piece of information regarding the rotation of the rotary element 3 by directly viewing/observing the rotation of the rotary indicator 5 by its own (visual) rotation effect.

The invention also provides an embodiment with a data control and collecting system 5, 6, 7, 8. According to the representation of FIG. 3, with a rotary indicator 5 used as such to be viewed directly by the user and/or as the target for the system's sensors. In this embodiment, the user can receive a piece of visual information regarding the rotation of the rotary element 3 by directly viewing/observing the rotation of the rotary indicator 5 and/or a piece of visual and/or audible information concerning the rotation of the rotary element 3 coming from the detection of data linked to the rotation of this element by the system's sensors.

It would also be possible to provide a data control and collecting system 5, 6, 7, 8 that does not use a rotation indicator 5. Here, the user can receive a piece of visual and/or audible information concerning the rotation of the rotary element 3 coming from the detection of data linked to the rotation of this element by the system's sensors.

In this way, the use of such a rotary indicator 5 and/or such a data control and collecting system 5, 6, 7, 8 with or without the rotary indicator 5 makes it possible to prevent the risk of a problem leading to an abnormal operation of the blower, more specifically of the rotary element 3, for example a problem of product jamming or a failure of the rotary element 3 to stop because of the inertia of its blades 3*a* in rotational movement. For example, by visually tracking the speed of rotation of the rotary indicator 5 or by viewing information concerning the data on a display panel and/or played using audio equipment, the user will be able to detect an abnormal change in the rotation speed of the rotary indicator 5, for example a slow-down due to a jamming problem, and will then be able to act (more quickly), for example on the conveyor and/or unraveling system 9, 10 and/or the opening up/closing means 11. The user will also be able to detect that the rotary element 3 is not completely stopped, thus avoiding being injured by the still-moving blades 3*a*.

Preferably, where the agricultural machine comprises the providing interface 8, the interface can comprise at least one touchscreen allowing to visually display the information about the detected data and/or the specific processing and enabling, possibly with a combined pointer device, an interaction between the user and the data control and collecting system 5, 6, 7, 8.

Where the detected data is representative of an abnormal operation of the blower, more specifically of the rotary element 3, for example a product jam, the data control and collecting system 5, 6, 7, 8 can be configured to be able to control the conveyor and/or unraveling system 9, 10 and/or, where applicable, the opening up/closing means 11 until the detected data is representative of normal operation of the blower 3, and more specifically of the rotary element 3. Where no detected data is representative of normal operation over a predefined period of time, i.e. that controlling the conveyor and/or unraveling system 9, 10 and/or, where applicable, the opening up/closing means 11 did not make it possible to solve the problem, jamming for example, the data control and collecting system 5, 6, 7, 8 can be configured to stop controlling the conveyor and/or unraveling system 9, 10 and/or, where applicable, the opening up/closing means 11.

On FIG. 1 in particular it can be seen that the conveyor and/or unraveling system 9, 10 may comprise, in a known manner, a conveying means 9 comprising a conveyor 9*a* and an actuator 9*b* of the electric motor type, for example making it possible to move the conveyor 9*a*. The conveyor 9*a* can be positioned on the floor 1*a* of the bin 1 or form part of the floor 1*a* and can be made up of crossbeams 90*a* driven by chains 90*b*, themselves driven by the actuator 9*b*. The conveyor and/or unraveling system 9, 10 may also comprise an unraveling means 10 comprising a rotary unraveling drum 10*a* located in front of the inlet opening 2*b* and above the conveyor 9, and an electric motor-, hydraulic- or a pulley/belt-driven type of actuator 10*b* for example, making it possible to activate the rotation of the unraveling drum 10*a* about its axis. In this way, the conveyor 9*a* enables the products entering the bin 1 to be transported to the rotary unraveling drum 10*a*, which transports them in a state (unraveled) suitable for their ejection into the ejection zone 2*a* by the rotary element 3 in rotation.

In a known manner, the unraveling drum 10*a* can be fitted with blades or cutting elements to shred the fibrous material and enable the turbine to be supplied in a uniform and regular manner. The fibrous materials, for example straw or hay, are packaged into cylindrical or rectangular parallelepiped bales. They are intended to be loaded into the bin 1 of the agricultural distribution machine.

The opening up/closing means 11 may comprise, in a known manner, a closing element of the flap 11*a* type and an actuator of the motor (or cylinder) type making it possible to drive the motion of the flap to open or close, partly or fully, the products inlet opening 2*b*.

Therefore, to achieve the control of the conveyor and/or unraveling system 9, 10 and/or, where applicable, of the opening up/closing means 11, the monitoring unit 7 can be functionally connected, for example by a wired connection, to the actuators 9*b*, 10*b* of the latter, and configured to control each actuator 9*b* in an on or off state. The monitoring unit 7 can control the actuators 9*b*, 10*b* to alter at least one setting of the conveyor and/or unraveling system 9, 10 such as its speed, direction of movement or switching on/off and/or to alter the state of the opening up/closing means 11 to adjust the amplitude of the inlet opening 2*b* into the ejection zone 2*a*. More specifically, as regards the conveyor and/or unraveling system 9, 10 in its particular form shown in FIG. 1, the settings may be the speed of movement (or of rotation) and/or the direction of movement (or of rotation) and/or the switching on/off of the conveyor 9*a* and/or of the rotary unraveling drum 10*a*. Regarding the particular form of the opening up/closing means 11, one setting may be the open/closed position of the flap 11*a*.

It is understood that controlling the conveyor and/or unraveling system 9, 10 and/or, where applicable, the opening up/closing means 11, consists, for the data control and collecting system 5, 6, 7, 8, of controlling the conveyor and/or unraveling system 9, 10 and/or, where applicable, the opening up/closing means 11 via the monitoring unit 7, according to actuation sequences predefined with regard to the problem that the user wants to solve and that leads to abnormal operation, for example the jamming problem. Such actuation sequences may, for example, especially to respond to a jamming problem leading more specifically to varying degrees of deceleration of the conveyor and/or unraveling system 9, 10, involve controlling:

- a slowing down (reduction in speed) of the conveyor and/or unraveling system 9, 10 (in its particular embodiment: a reduction in the speed of the conveyor 9a and/or of the rotary unraveling drum 10a), especially when a small deceleration of the rotary element 3 has been detected, and/or
- stopping the conveyor and/or unraveling system 9, 10, especially where there is a sudden deceleration of the rotary element 3, and/or
- an inversion of the direction of movement of the conveyor and/or unraveling system 9, 10 (in its particular embodiment: inversion of the direction of movement or reversing of the conveyor 9a and/or inversion of the direction of rotation of the rotary unraveling drum 10a), particularly when there is a sudden deceleration of the rotary element 3 and/or, where applicable,
- a reduction of the product inlet opening 2b into the ejection zone by appropriately adjusting the opening up/closing means 11.

Where the agricultural distribution machine has a data control and collecting system 5, 6, 7, 8, and the monitoring unit 7 is connected to one or more sensors able to detect the operating parameters of the agricultural distribution machine, its operation can be regulated or even automated based on signals from the measuring means and operating programs specific to the distribution mode or based on the type of product to be distributed. Such measuring means are for example sensors intended to be installed on the conveyor and/or unraveling system 9, 10, on the opening up/closing means 11, and/or on other elements present on the agricultural distribution machine. The sensors are configured to detect any appropriate operating parameter linked to the operation of the agricultural distribution machine or one of its elements, especially the rpm, speed, torque, position, flow rate or pressure, an image, etc.

The data control and collecting system 5, 6, 7, 8 may comprise a sound warning and/or a visual warning. Such a warning can be materialized by the providing interface 8 adapted for this purpose. The visual warning may comprise one or more warning lights or light information displayed on a screen. Such a warning can be triggered by the electronic monitoring unit 7, based on the result of the data processing related to the rotation of the rotary element 3, for example where an abnormal slowdown is detected.

The subject of the present invention is also an agricultural distribution machine and tractor vehicle combination, the agricultural machine being towed by the tractor vehicle comprising a driver's cab.

Still in accordance with the present invention, the agricultural machine consists of an agricultural machine according to the present invention, with the providing interface 8 at least partly mounted in the driver's cab of the tractor vehicle.

Of course, the invention is not limited to the example embodiment described and shown in the attached drawings. Modifications remain possible, in particular concerning the composition of the various elements or the substitution of technical equivalents without departing from the scope of protection of the invention.

The invention claimed is:

1. An agricultural machine for distributing products for animal feeding and/or straw bedding, the machine comprising:
   - a bin delimiting an inner product receiving zone,
   - a distribution blower comprising a casing positioned on one side of the bin and enclosing a product ejection zone, the casing comprising an inlet opening communicating with the receiving zone and an outlet opening; and a rotary element fitted with blades and mounted in rotation around a rotation axis in the ejection zone to be able to generate in the ejection zone a flow of air, driving the products, with motion of the blades, towards the outlet opening,
   - a drive shaft for the rotary element, a conveyor and/or unraveling system configured to transport the products from a product receiving zone to the ejection zone, and an opening up/closing means of the inlet opening,
   - a transmission configured to transmit rotation movement of a motor shaft to the drive shaft, the transmission including a transmission box and a transmission device enclosed by the transmission box, the transmission box including walls that delimit an inner space containing the transmission device, and
   - a rotary indicator positioned outside the ejection zone and able to be driven in rotation directly or indirectly by the drive shaft, the rotary indicator providing, to a user, a visual indication of the rotation of the rotary element by a visual rotation effect of the rotary indicator, the rotary indicator being disposed on an exterior surface of one of the walls of the transmission box so as to be visible from outside the transmission box.

2. The agricultural distribution machine according to claim 1, wherein the rotary indicator is fastened onto the drive shaft to be driven in rotation around the rotation axis.

3. The agricultural distribution machine according to claim 2, wherein the rotary indicator is fastened to a fastening end of the drive shaft.

4. The agricultural distribution machine according to claim 1, wherein the drive shaft comprises a first portion connected to the rotary element and a second portion comprising a fastening end, and wherein the transmission comprises an output shaft forming the second portion of the drive shaft.

5. The agricultural distribution machine according to claim 1, wherein the rotary indicator is disk-shaped with two opposite faces, one of which is visible to the user and has at least two distinct markings.

6. The agricultural distribution machine according to claim 1, wherein the rotary indicator is oblong, oval, not round, elongated, diamond-, star- or needle-shaped.

7. The agricultural distribution machine according to claim 1, further comprising a data control and collecting system related to the rotation of the rotary element, the data control and collecting system comprising a providing interface, sensors able to detect data and deliver signals representative of the data, and an electronic monitoring unit able to process the signals and transmit information relative to the data to the providing interface to display the data visually.

8. The agricultural distribution machine according to claim 7, wherein the sensors comprise at least one inductive, optical, or capacitive sensor and at least one target able to be detected by the sensor and fastened on, or built into, or formed by the rotary element or the drive shaft or the rotary indicator.

9. The agricultural distribution machine according to claim 7, wherein the providing interface comprises at least one touchscreen configured to visually display the information related to the detected data.

10. The agricultural distribution machine according to claim 7, wherein, where the detected data is representative of an abnormal operation of the blower, the data control and collecting system is configured to be able to control at least one of the conveyor, the unraveling system, the rotary element and, the opening up/closing means, until the detected data is representative of normal operation of the blower.

11. The agricultural distribution machine according to claim 1, further comprising a data control and collecting system related to the rotation of the rotary element, the data control and collecting system comprising a providing interface, sensors able to detect the data and deliver signals representative of the data, and an electronic monitoring unit able to process the signals and transmit information relative to the data to the providing interface to play the data as sound.

12. The agricultural distribution machine according to claim 1, further comprising a data control and collecting system related to the rotation of the rotary element, the data and collecting system comprising a providing interface, sensors able to detect data and deliver signals representative of the data, and an electronic monitoring unit able to process the signals according to a specific processing program for determining whether the detected data is representative of normal or abnormal operation of the rotary element.

13. A system comprising:
the agricultural distribution machine according to claim 1; and
a tractor vehicle configured to tow the agricultural distribution machine, the tractor vehicle comprising a driver's cab,
wherein a providing interface is at least partly mounted in the driver's cab of the tractor vehicle.

14. The agricultural distribution machine according to claim 1, wherein the transmission box includes a front wall which faces a forward direction of the agricultural distribution machine, and the rotary indicator is positioned on the front wall of the transmission box.

15. The agricultural distribution machine according to claim 2, wherein the rotary indicator is centered on the rotation axis.

16. The agricultural distribution machine according to claim 5, wherein the rotary indicator has two different colors.

* * * * *